US006754666B1

(12) United States Patent
Brookler et al.

(10) Patent No.: US 6,754,666 B1
(45) Date of Patent: Jun. 22, 2004

(54) EFFICIENT STORAGE AND ACCESS IN A DATABASE MANAGEMENT SYSTEM

(75) Inventors: David E. Brookler, Los Angeles, CA (US); Ariel Hazi, Los Angeles, CA (US); Dave L. Sullivan, North Hollywood, CA (US); Dominic Tham, Los Angeles, CA (US); Philip A. Tinari, Beverly Hills, CA (US); Paul N. Weinberg, Los Angeles, CA (US)

(73) Assignee: A2i, Inc., Los Angeles, CA (US)

( * ) Notice: Subject to any disclaimer, the term of this patent is extended or adjusted under 35 U.S.C. 154(b) by 453 days.

(21) Appl. No.: 09/643,208

(22) Filed: Aug. 21, 2000

Related U.S. Application Data

(60) Provisional application No. 60/149,855, filed on Aug. 19, 1999.

(51) Int. Cl.[7] ............................. G06F 17/00; G06F 7/00
(52) U.S. Cl. ..................... 707/102; 707/104.1; 705/29
(58) Field of Search ................................ 707/100, 102, 707/104.1, 103 R, 103 Y; 705/28–29

(56) References Cited

U.S. PATENT DOCUMENTS

| | | | | | |
|---|---|---|---|---|---|
| 4,680,705 | A | * | 7/1987 | Shu ............................. 707/101 |
| 5,291,583 | A | * | 3/1994 | Bapat .......................... 717/137 |
| 5,369,761 | A | * | 11/1994 | Conley et al. ................. 707/2 |
| 5,418,961 | A | * | 5/1995 | Segal et al. ..................... 707/1 |
| 5,566,333 | A | * | 10/1996 | Olson et al. ................. 707/102 |
| 5,717,924 | A | * | 2/1998 | Kawai ......................... 707/102 |
| 5,724,577 | A | * | 3/1998 | Exley et al. ................. 707/100 |
| 5,778,375 | A | * | 7/1998 | Hecht .......................... 707/101 |
| 5,842,212 | A | * | 11/1998 | Ballurio et al. ............. 707/100 |
| 5,855,013 | A | * | 12/1998 | Fisk .............................. 707/3 |
| 5,870,749 | A | * | 2/1999 | Adusumilli ................. 707/101 |
| 5,974,407 | A | * | 10/1999 | Sacks ............................ 707/2 |
| 6,006,234 | A | * | 12/1999 | Govindarajan et al. . 707/103 R |
| 6,163,781 | A | * | 12/2000 | Wess, Jr. ................. 707/103 X |
| 6,301,581 | B1 | | 10/2001 | Smiley .................... 707/103 R |
| 6,397,221 | B1 | * | 5/2002 | Greef et al. ................. 707/102 |
| 6,480,857 | B1 | * | 11/2002 | Chandler .................... 707/100 |
| 6,665,677 | B1 | * | 12/2003 | Wotring et al. ............. 707/100 |
| 2002/0010700 | A1 | * | 1/2002 | Worting et al. ............. 707/100 |
| 2002/0035555 | A1 | * | 3/2002 | Wheeler et al. ............... 707/1 |

OTHER PUBLICATIONS

Elmasri, R., J. Weeldreyer and A. Hevner "The Category Concept: An Extension to the Entity–Relationship Model", International Journal of Data & Knowledge Engineering, vol. 1, No. 1, pp. 75–116, 1985.*

Meier, A. et al. "Hierarchical to Relational Database Migration", IEEE Software, vol. 11, No. 3, pp. 21–27, May 1994.*

Abu–Handeh, R., J. Cordy and P. Martin "Schema Translation Using Structural Transformation", Proceedings of CASCON'94, pp. 202–215, Nov. 1994.*

(List continued on next page.)

*Primary Examiner*—John Breene
*Assistant Examiner*—Luke S Wassum
(74) *Attorney, Agent, or Firm*—Dalina Law Group P.C.; Joseph J. Mayo

(57) ABSTRACT

The present invention provides for storage of data items with dissimilar structures in a single database table while minimizing the problems associated with prior approaches. In one aspect of the invention, a method of efficiently storing data items in a database management system (DBMS) is provided wherein each data item has at least one attribute associated with it, the method comprising identifying a set of attributes associated with each data item, creating, for use with all of the data items, a common data structure that excludes those attributes unique to any one of the data items, and associating each data item with attributes excluded from the data structure.

22 Claims, 15 Drawing Sheets

OTHER PUBLICATIONS

Elgalal, B. "Support for Object–Oriented Databse Schema Design", Lancaster (UK) Univesity Computing Department, Research Report SE/9/1994, 1994.*

Schildt, H. "C: The Complete Reference", Berkeley:Osbourne McGraw–Hill, pp. 198–201, 1990. ISBN 0–07–881538–X.

Elgalal, B. "Support for Object–Oriented Database Schema Design", Lancaster (UK) University Computing Department, Research Report SE/9/1994, 1994.

Codd, E.F. "A Relational Model of Data for Large Schared Data Banks", Communications of the ACM, vol. 13, No. 6, pp. 377–387, Jun. 1970.*

Chen, P.P–S. "The Entity–Relationship Model—Toward a Unified View of Data", ACM Transactions on Database Systems, vol. No. 1, pp. 9–36, Mar. 1976.*

Batini, C., M. Lenzerini and S.B. Navathe "A Comparative Analysis of Methodoligies for Database Schema Integration", ACM Computing Surveys, vol. 18, No. 4, pp. 323–364, Dec. 1986.*

Zhang, Y. amd M.E. Orlowska "Transform a NIAM Conceptual Schema into an EKNF Relational Database Schema", Proceedings of the International Conference on Databases, Parallel Architectures and their Applications (PARBASE–90), p. 56 Mar. 7–9, 1990 Abstract.*

Schildt, H. "C: The Complete Reference", Berkeley:Osbourne McGraw–Hill, pp. 198–201, 1990. ISBN 0–07–881538–X.

ter Hofstede, A.H.M., and Th.P. van der Weide "Expressiveness in Conceptual Data Modeling", Data & Knowledge Engineerin vol. 10, No. 1, pp. 65–100, Feb. 1993.

Song, I–Y. and H.M. Godsey "A Knowledge Based Object–Oriented Database Schema Generator", Proceedings of the IEEE International Conference on Developing & Managing Intelligent Systems, pp. 160–167, Mar. 29–31, 1993.

Lim, E–P. and J. Srivastava "Entity Identification in Databse Integration: An Evidential Reasoning Approach", University of Minnesota Department of Computer Science, 1993.

Miller, R.J., Y.E. loannidis and R. Ramakrishnan "The Use of Information Capacity in Schema Integration and Translation", Proceedings of the 19th VLDB Conference, pp. 120–1333, 1993.*

Elgalal, B. "Support for Object–Oriented Database Schema Design", Lancaster (UK) University Computing Department, Research Report SE/9/1994, 1994.*

Rajasekar, A. R. Marciano and R. Moore Collection–Based Persistent Archives, Proceedings of the IEEE Symposium on Mass Storage Systems, pp. 176–184, Mar. 15–18, 1999.*

A2i, "Product Catalogs: Why a Relational DBMS and SQL Are Not Enough", Technical White Paper, version 1.03, May 9, 2001.*

A2i "Product Catalogs and xCat: How A2i Overcomes the SQL Funtionality and Performance Gap", Technical White Paper, Version 1.08, May 20, 2001.*

* cited by examiner

| Category ID | Parent Category ID | Position |
|---|---|---|
| | | |

| Category ID | Parent Category ID | Position |
|---|---|---|
| 1 | 0 | 1 |
| 2 | 1 | 1 |
| 3 | 2 | 1 |
| 4 | 2 | 2 |
| 5 | 4 | 2 |
| 6 | 4 | 1 |

610
611
612
613
614
615

604

| Category ID | Attribute ID |
|---|---|
| ⋮ | ⋮ |
| 2 | 1 |
| ⋮ | ⋮ |
| 3 | 2 |
| ⋮ | ⋮ |

| Attribute ID | Attribute Type | Attribute Name | Ratings | Measurement Type | |
|---|---|---|---|---|---|
| 1 | Characteristic | Weight | Typical | Weight | 707A |
| 2 | Feature | Memory | | | 707B |

| Attribute ID | Feature Value ID | Feature Value |
|---|---|---|
| 2 | 1 | 64 MB |
| 2 | 2 | 16 MB |
| 2 | 3 | 4 MB |

Fig. 7

Table 801

| UFT ID | CategoryID | Description | Price |
|---|---|---|---|
| 3 | 2 | Acme Laptop | $2,500.00 |

Table 803

| Category ID | Alias |
|---|---|
| 2 | -1 |

Table 804 (804A, 804B)

| Category ID | Attribute ID |
|---|---|
| 2 | 1 |
| 2 | 2 |

Table 805

| UFT ID | Attribute ID | Feature Value ID |
|---|---|---|
| 3 | 2 | 1 |

Table 808

| Attribute ID | Feature Value ID | Feature Value |
|---|---|---|
| 2 | 1 | 64 MB |
| 2 | 2 | 16 MB |
| 2 | 3 | 4 MB |

Table 806

| UFT ID | Attribute ID | Rating | Value | Units |
|---|---|---|---|---|
| 3 | 1 | Nominal | 8.22 | lbs. |

Table 800

| UFT ID | Category ID | Description | Price | Weight | Memory |
|---|---|---|---|---|---|
| 3 | 2 | Acme Laptop | $2,500.00 | 8.22 lbs | 64 MB |

EFFICIENT STORAGE AND ACCESS IN A DATABASE MANAGEMENT SYSTEM

This application claims the benefit of U.S. Provisional Application No. 60/149,855, filed Aug. 19, 1999.

BACKGROUND OF THE INVENTION

1. Field Of The Invention

The present invention relates to storage and access of data in a database, and, more particularly, to a method and apparatus and data structures used therein such that wherein data elements with dissimilar structures may be stored in one table, with minimal wasted space, to allow for efficient data access, each data element being stored in a record of the table and having a category designation to associate the record with a set of attributes that are stored in another location, a category hierarchy is provided and allows for attribute inheritance of a parent's attributes by a child category.

2. Description Of The Related Art

A DBMS (Database Management System) is used to manage data and is comprised of computer-executable code that may be used to define the structure of data and to access data within the defined structure. One example of a DBMS is a relational DBMS, or RDBMS. An RDBMS manages tables that make up a relational database as well as the data contained in the tables. In an RDBMS, data is organized in rows (or records) and columns (or fields) of the tables, and two or more tables may be related based on like data values. The intersection of a row and column in a table is referred to as a cell and contains the data value for a particular field of a particular record.

A DML (data manipulation language) such as SQL (Structured Query Language) is typically used to store, retrieve and modify data in a table. A schema defines the structure of a database, i.e., each table and the fields within a record of a table. A schema is itself considered data that is stored in one or more tables. Therefore, like other data in a database, a DML may be used to store, retrieve and modify the data in the database as well as the structure of a database.

In addition to an RDBMS, other examples of data management approaches include file management systems, flat files and hierarchical database management systems. There are, however, shortcomings with the existing data management approaches.

One such disadvantage has to do with the use of hierarchically-related data in an RDBMS. A hierarchy of data necessarily involves parent/child relationships. For example, a data item can be a parent and/or a child of another data item. In a conventional RDBMS, a row in one table may be related to a row in another table. However, the relationship represents a peer (or same-level) relationship rather than a hierarchical (or parent/child) relationship. Consequently, complicated and/or nonstandard mechanisms are used in the conventional DBMS to represent a parent/child hierarchical relationship using the simple row/column tabular structure of a relational database.

FIGS. 1A through 1C provide an example of a hierarchy in the form of a tree 140 with nodes 100 to 105. Node 100 is a root node, or node with no parent node in the hierarchy. Node 100 and nodes 101 to 103 are internal nodes (i.e., nodes with at least one child). Nodes 104 and 105 are leaf nodes (i.e., a node that has no children).

In an RDBMS, a "single table" approach may be used to represent the hierarchy depicted in FIG. 1A wherein each node is a record of a table and each record contains one or more fields to store the hierarchical relationships with other nodes. A disadvantage of this approach is that it is very difficult to dynamically alter the structure of the database once it is populated with data. Thus, it is necessary to pre-allocate a specific number of fields that may be needed to store the hierarchical relationships which may be inaccurate. If there are not enough fields allocated for storing hierarchical relationships, the structure of the database (e.g., the structure of the table containing the fields that store the hierarchical relationships) must be altered before storing additional relationships in the database. Conventional approaches to re-structuring a populated database requires that existing data be moved to new tables and introduces the possibility of lost data. Thus, it has been thought to be better to err on the side of too many fields. However, this approach results in wasted space as not all records will use the maximum number of fields allocated to store the hierarchical relationships.

Referring to FIG. 1B, database 141 includes a record (in one or more tables of the database) for each of nodes 100 through 105. Specifically, record 110 corresponds to node 100 and contains a field 130 that is used to identify record 110 (i.e., a record identification, or record ID) in the database. Field 130 is also included in records 111 through 113 and contains the record ID of record 110 indicating that records 111 through 113 are child records of record 110. Records 111 through 113 each include a record ID in fields 121 through 123, respectively. Since record 114 is a child of record 111, it includes field 121 that contains the record ID of record 111.

Node 105 of tree 140 has two parents (i.e., nodes 102 and 103). To reflect this structure, record 115 of database 141 must include two fields (i.e., fields 122 and 123) that each refer to one of the parent records of record 115. Since there is no easy mechanism for dynamically altering the structure, or schema, of the table, an attempt must be made to accurately predict the number of parents a record may have when creating the database schema. As discussed above, there are tradeoffs and drawbacks with both a low and high prediction. Further, it is virtually certain that there will be wasted space no matter what the prediction.

Another approach used in an RDBMS borrows from the file management approach that is used in most operating systems and is hierarchical in nature. In a file management system, the nodes consist of a directory and a file. Each directory is an internal node of the hierarchy, while each file is a leaf node of the hierarchy. Where a file (or directory) has multiple parents, multiple copies are needed such that a copy of the file (or directory) is stored in each of the parent directories.

Using this approach in an RDBMS, each node of the hierarchy is represented as a table in the RDBMS. However, the number of tables increases with the number of internal nodes, which tends to be proportional to the size of the hierarchy. It is also extremely difficult and complex to navigate between the nodes of the hierarchy since each node is located in a separate table.

Using this approach, for example, records 110 through 115 in FIG. 1B become single-record tables with two tables created for record 115. FIG. 1C illustrates the new structure used for record is 115. Each of single-record tables 155 and 156 contain a copy of the data contained in record 115 with the exception of fields 122 and 123. Table 155 includes field 122 that identifies Node 102 as its parent, and table 156 includes field 123 to identify node 103 as its parent. Tables 155 and 156 are duplicates with the only difference between the two tables being the reference to the parent table.

Thus, a disadvantage of the file management approach is that when, as in the case of node 105, a node with multiple parents, multiple copies of the node need to be maintained as separate tables. This is wasteful of space and difficult to manage, and data integrity can easily be violated if an update is not reflected in all of the copies of the node it affects.

Hierarchical databases are an efficient approach to storing records that relate to one another in a hierarchical manner. However, records are not stored in tables and thus hierarchical databases do not enjoy the benefits of the relational model. For example, hierarchical databases do not have the ability to relate a table to one or more other tables based on like cell values.

In addition to the inefficient storage of hierarchical structures in an RDBMS, another disadvantage with existing DBMSs is in the manner in which data is stored and searched. Relational databases are designed to store tables of data where each record in the table consists of exactly the same set of fields. A problem arises when records contain fields that pertain only to a subset of the records. For example, where a table stores product information for a diverse set of products, a field used for one product may not be needed for another product. To illustrate, a printer may have printing speed (number of pages per minute) data while a monitor does not. A single record structure used to store data associated with both requires that the record include a printing speed field even though a monitor record does not have printing speed data and therefore would not use the field.

There are various approaches that have been used to address the problem of dissimilar data structures.

A "single table" approach stores all the records in a single table. Since a relational database requires that the set of fields must be the same for all records in a table, all of the attributes (i.e., a data element that is not common to all records) must be treated as if they were common to all the records. The result is a wide table that contains a very large number of fields. These fields must include not only the data elements common to all of the records but also the data elements for the entire set of attributes. In this approach, a record that does not possess a particular attribute simply does not store a data value in the corresponding cell.

The benefit of this approach is that all the records are stored in a single table, which supports efficient searching of the database. However, there is a lot of wasted space used by empty cells that do not and should not have data. Furthermore, it is difficult to distinguish between empty cells that have no data because the data is missing and those that have no data because they don't apply to the category to which the record belongs. Conversely, this approach permits the storage of erroneous data in attribute cells that do not apply to a particular record and should be left empty.

A "table per category" approach partitions the records into different categories based on the attributes used in each record. A table is defined for each category that includes the fields that comprise the category as well as the fields that are common to all the records and the fields common only to the records of that particular category.

This approach does provide for efficient storage of the data. However, as the number of categories increases, so does the number of tables. Data management and searching for records then become increasingly complex and time-consuming because data-based operations require that many tables be accessed.

Conventional data management systems allow a user to change the database schema after the database has been created, but changing table structures on a populated database can often cause loss of existing data. Most systems also have tools to update existing data, but these updates are typically limited to changing individual data values of individual records.

Data management systems lack the tools necessary to perform more extensive restructuring of data, such as bulk updates to large groups of records or changing data types and interrelationships between database records, while still allowing the data to be accessed (e.g., for retrieval and modification). To perform extensive restructuring, the traditional approach is either to define a correct structure prior to importing the date, or export the data to another location (e.g., a file and/or another application), edit and restructure the database and then reimport the data into the modified database structure.

However, the traditional approaches used to edit and restructure database data have several disadvantages. First, the database may be too large to practically export the entire contents into another application. Second, very few applications even provide a comprehensive set of tools to allow data to be edited and structured, and interrelationships between data records to be defined. Finally, the correct structures and interrelationships between the data records may not be immediately obvious, or may change over time, so that structuring the data may be an iterative process that is done on a continuous and ongoing basis, in which case constantly exporting and reimporting the data can become difficult or even impossible.

Thus, it would be beneficial to have a mechanism to represent hierarchies and relationships (e.g., parent/child relationships) within a hierarchy, the mechanism providing a standard approach for such representation. Further, it would be beneficial to have a mechanism for storing data records having dissimilar record structures in the same database table in an efficient manner, and for facilitating in-place schema and data manipulation.

SUMMARY OF THE INVENTION

The present invention addresses the foregoing problems and provides for the storage of data items with dissimilar structures in a set of tables while minimizing the wasted space typical of the prior art single table approach. The number of tables in the set of tables may be set, or fixed.

In one aspect of the invention, a method of efficiently storing data items in a database management system (DBMS) is provided wherein each data item has at least one attribute associated with it, the method comprising identifying a set of attributes associated with each data item, creating, for use with all of the data items, a common data structure that excludes those attributes unique to any one of the data items, and associating each data item with attributes excluded from the data structure.

That is, the elements of data (e.g., price, description, print speed and resolution) for each of the data items (e.g., monitor, printer, and scanner) to be stored in the database are identified. The data elements that all of the data items have in common are used to create a record structure for a table in which each of the common data elements is a field in the record. Further, the common record structure contains a reference that associates a data item with those data elements, or attributes, that are not common to all other of the data items to be stored using the common record structure.

Thus, it is possible using the present invention to store data items in a database table using a single record structure while eliminating wasted space typical of the convention single table approach. Contrary to prior single table approaches, there is no need to include the fields from all of the data items in each record of the table regardless of whether a field is used to store data for the data item. Rather, zero or more attributes are associated with each category, and a category is associated with each data item with a dissimilar structure. By virtue of the association with a category, it is possible to identify the fields that arc needed to store values associated with the data item in the database.

A single record structure is used to store a data item regardless of the actual fields needed to store data values associated with a data item. Accessing records in a single table is more efficient than accessing multiple tables. Further, there is no need to maintain fields that are not being used by a particular data element.

In addition to the table that contains the data item, one or more tables are used to define the categories, the attributes (or fields), the relationships between the attributes and the categories and the values associated with the attributes of the data item.

Properties may be defined for each attribute such as type. Examples of attribute type are feature and characteristic. An attribute of type feature has enumerated values from which a value (or values) for the attribute may be selected. Examples of feature attributes are color and material. The set of enumerated values is known as the feature domain. A feature can also be defined as multi-valued, which allows a feature to store multiple values for a single attribute.

A characteristic attribute is used when the possible values are not enumerated values but are continuous or numeric values, for example. A characteristic attribute is an attribute that stores continuous, numeric values. Attributes such as temperature and weight are characteristic attributes. They can further be broken down into different ratings that describe what the characteristic attribute is measuring. There can be multiple ratings such as nominal, minimum, maximum, average and typical. Other properties such as value and physical dimension (such as length or speed) with particular units of measure (such as meter or inch) may also be associated with an attribute.

In another aspect of the invention, properties may be associated with a category such as whether or not the category is an alias of another category or is hidden. Category aliases allow a category to exist in multiple places within the category hierarchy. As is discussed in more detail below, an alias designation may effect whether or not a category inherits attributes from a parent category.

Yet another aspect of the present invention provides a mechanism for representing hierarchical relationships between nodes in the hierarchy separate from the nodes themselves. In so doing, it is possible to modify the interrelationships between nodes in a hierarchy without actually modifying the nodes. For example, using the present invention a hierarchy of categories may be created such that the category hierarchy is stored separate from the category nodes. Further, the attributes associated with a parent category may be inherited by a child category.

At least one table is provided wherein each record in the table corresponds to a node in the hierarchy. The relationship (s) between data items (or nodes) in records of the table are stored separately in a relationship table. That is, the nodes and the relationships between the nodes are stored separately in one or more tables and together comprise a hierarchical structure. As with all tables in an RDBMS, node and relationship tables are relatable using the relational capabilities of the RDBMS.

Since hierarchical relationships are stored separate from the data items, it is very efficient to navigate between the data items in a hierarchy. Furthermore, if additional information needs to be associated with a hierarchical relationship, it can easily be added to the relationship table, without effecting the data item table. In addition, multiple parentage is possible without the need for duplicate copies of data items by separating the storage of the data items from the relationships among the data items.

In another aspect of the invention, the relationship table contains position information associated with the children which is stored as part of a parent/child link. Advantageously, a node's position among other nodes in the same level of the hierarchy may be determined from the information stored in the relationship table.

In yet another aspect of the invention, a matching set defines a relationship between two or more nodes by identifying one or more matching attributes whose values may be compared to determine whether a match exists. Thus, given one node, the matching data items in another node may be identified.

In yet another aspect of the invention, hierarchy aliases provide an alternative to multiple parents that also allow a leaf node to exist in multiple locations in the hierarchy. Whereas a single node has multiple parents, a hierarchy alias is a reference to another node where both the reference and the original each have only a single parent.

In another aspect of the invention, hidden nodes are provided to support the ability to have both a detailed view and a consolidated view of the underlying data hierarchy.

This brief summary has been provided so that the nature of the invention may be understood quickly. A more complete understanding of the invention can be obtained by reference to the following detailed description of the preferred embodiment(s) thereof in connection with the attached drawings.

BRIEF DESCRIPTION OF THE DRAWINGS

FIGS. 6A through 6C illustrates a category hierarchy defined by category hierarchy table 402 according to the present invention.

FIG. 7 provides an example of attribute and feature value tables 407 and 408 according to the present invention populated with data.

FIG. 8 provides an example of a data item definition obtained from the tables in FIG. 4.

DETAILED DESCRIPTION OF THE PREFERRED EMBODIMENTS

Figure 1A:
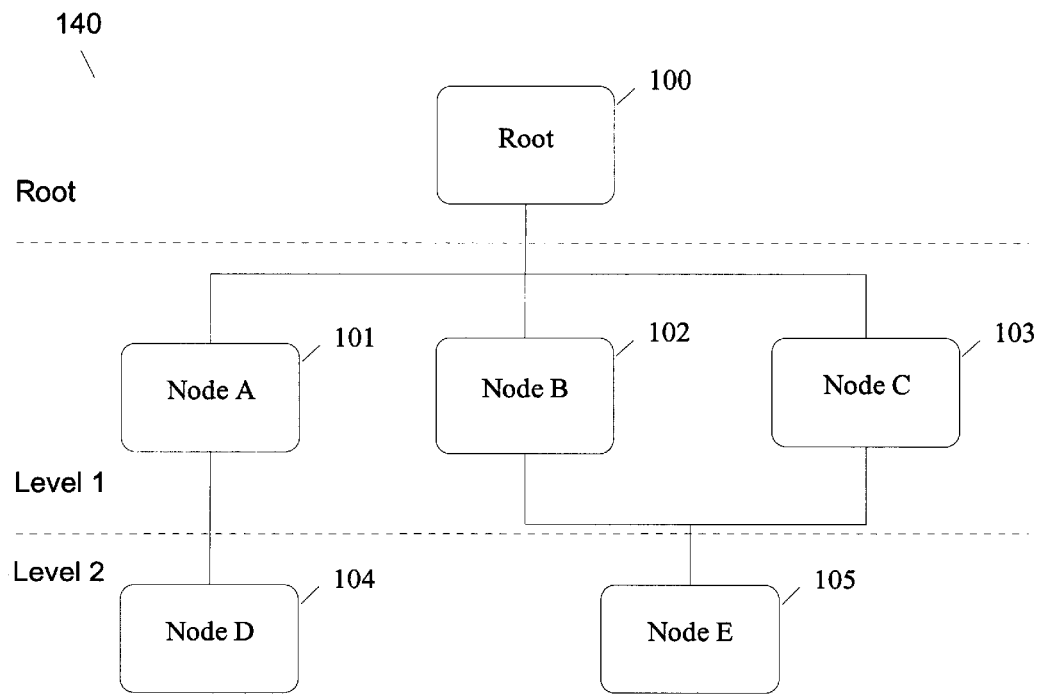
FIGS. 1A through 1C provide an example of a hierarchy in the form of a tree with nodes.
Figure 1C:
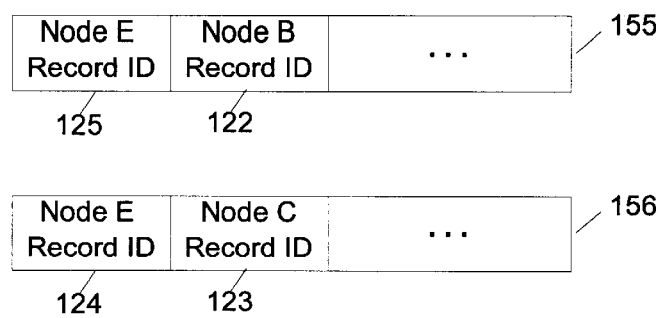
Figure 1B:
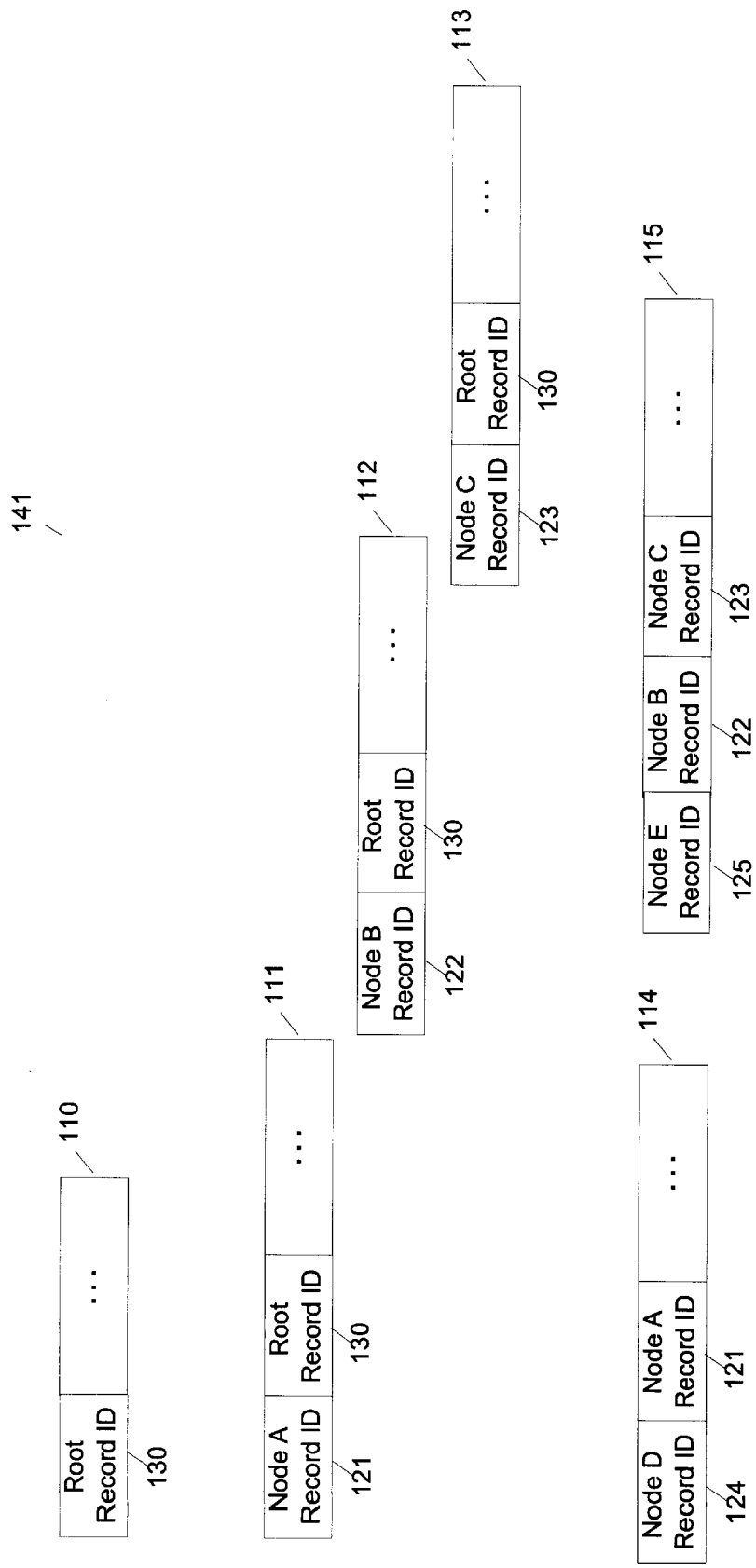
Figure 2:
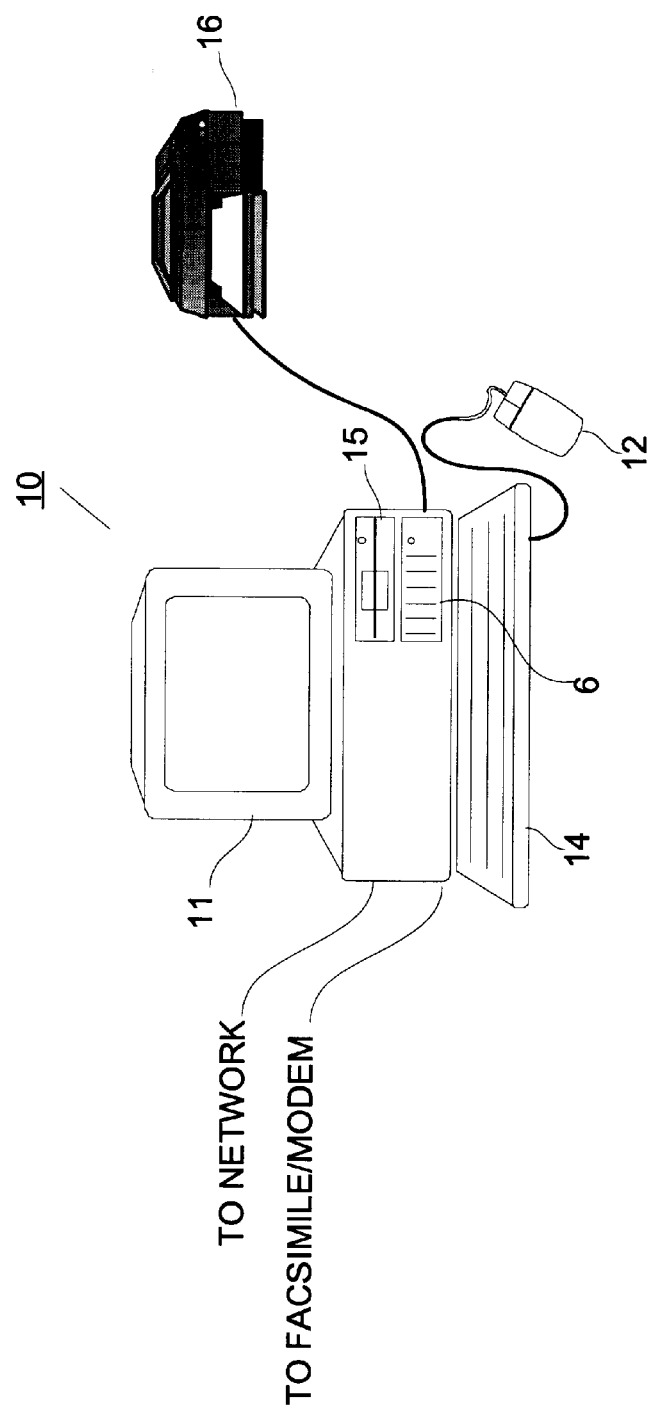
FIG. 2 is an outward view of a hardware environment embodying the present invention.

FIG. 2 is an outward view of representative computing hardware embodying the present invention. Shown in FIG. 2 are computer 10 executing an operating system, display monitor 11 for displaying text and images to a user, keyboard 14 for entering text and commands into computer 10, and mouse 12 for manipulating and for selecting objects displayed on display monitor 11, or for output to an output device such as printer 16. Also included with computer 10 are fixed disk drive 6, in which are stored application programs, such as a DBMS and other applications, data files, and device drivers for controlling peripheral devices attached to computer 10, floppy disk drive 15 for use in reading data from and writing data to floppy disks inserted therein. Data and/or applications may also be accessed from a CD-ROM via a CD-ROM drive (not shown) or over a network to which computer 10 may be connected (network connection not shown).

Figure 3:
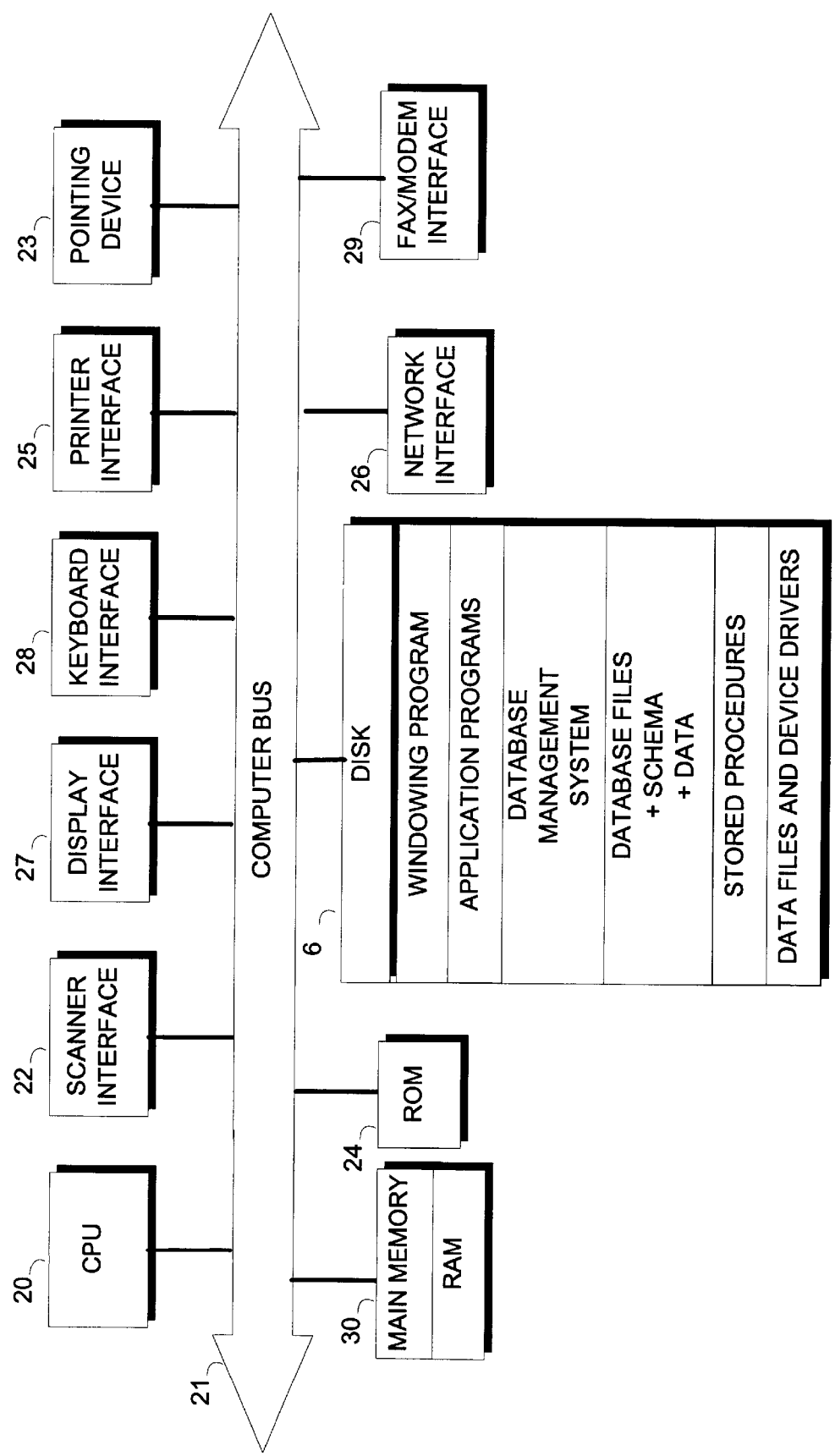
FIG. 3 is a block diagram of the internal architecture of a typical computer for use in conjunction with the present invention.

FIG. 3 is a block diagram of the internal architecture of computer 10. Shown in FIG. 3 are CPU 20, which may be any microprocessor including, but not limited to, a Pentium-type microprocessor, interfaced to computer bus 21. Also interfaced to computer bus 21 are printer interface 25, to allow computer 10 to communicate with printer 16, modem interface 29 to enable communications between computer 10 and a modem, display interface 27 for interfacing with display monitor 11, keyboard interface 28 for interfacing with keyboard 14, mouse interface 23 for interfacing with mouse 12, and network interface 26 for connecting to a network (e.g., Internet, intranet, local area network, etc.).

Read only memory (ROM) 24 stores invariant computer-executable process steps for basic system functions such as basic I/O, start up, or reception of keystrokes from keyboard 14.

Main random access memory (RAM) 30 provides CPU 20 with memory storage which can be accessed quickly. In this regard, computer-executable process steps of a DBMS or other application are transferred from disk 6 over computer bus 21 to RAM 32 and executed therefrom by CPU 20.

Also shown in FIG. 3 is disk 6 which, as described above, includes a windowing operating system, a DBMS which includes data stored therein as well as schema and data stored in one or more tables defined in the schema. Further, disk 6 may be used to store executable-code (e.g., stored procedures) comprising steps described herein for efficiently storing and accessing data such as the data stored in a database. Disk 6 further includes data files and device drivers as shown.

The present invention provides for the storage of data items with dissimilar structures in a single table while minimizing the wasted space typical of the prior art single table approach. Contrary to the prior art single table approach, there is no need to include the fields from all of the data items in each record of the table regardless of whether a field is used to store data for the data item. Rather, zero or more attributes are associated with each category, and a category is associated with each data item with a dissimilar structure. By virtue of the association with a category, it is possible to identify the fields that are needed to store values associated with the data item in the database.

A single record structure is used to store a data item regardless of the actual fields needed to store data values associated with a data item. Accessing records in a single table is more efficient than accessing multiple tables. Further, there is no need to maintain fields that are not being used by a particular data element.

In addition to the table that contains the data item, one or more tables are used to define the categories, the attributes, the relationships between attributes and the categories, and the values associated with the attributes of the data item.

Properties may be defined for each attribute such as type. Examples of attribute type are feature and characteristic. An attribute of type feature has enumerated values from which a value (or values) for the attribute may be selected. Examples of feature attributes are color and material. The set of enumerated values is known as the feature domain. A feature can also be defined as multi-valued, which allows a feature to store multiple values for a single attribute.

A characteristic attribute is used when the possible values are not enumerated values but are continuous or numeric values, for example. Attributes such as temperature and weight are characteristic attributes. They can further be broken down into different ratings that describe what the characteristic attribute is measuring. There can be multiple ratings such as nominal, minimum, maximum, average and typical. Other properties such as value and physical dimension (such as length or speed) with particular units of measure (such as meter or inch) may also be associated with an attribute.

In another aspect of the invention, properties may be associated with a category such as whether or not the category is an alias of another category or is hidden. Category aliases allow a category to exist in multiple places within the category hierarchy. As is discussed in more detail below, an alias designation may effect whether or not a category inherits attributes from a parent category.

Yet another aspect of the present invention provides a mechanism for representing hierarchical relationships between nodes in the hierarchy separate from the nodes themselves. In so doing, it is possible to modify the inter-relationships between nodes in a hierarchy without actually modifying the nodes. For example, using the present invention a hierarchy of categories may be created such that the category hierarchy is stored separate from the category nodes. Further, the attributes associated with a parent category may be inherited by a child category.

At least one table is provided wherein each record in the table corresponds to a node in the hierarchy. The relationship(s) between data items (or nodes) in records of the table are stored separately in a relationship table. That is, the nodes and the relationships between the nodes are stored separately in one or more tables and together comprise a hierarchical structure. As with all tables in an RDBMS, node and relationship tables are relatable using the relational capabilities of the RDBMS.

Since hierarchical relationships are stored separate from the data items, it is very efficient to navigate between the data items in a hierarchy. Furthermore, if additional information needs to be associated with a hierarchical relationship, it can easily be added to the relationship table, without affecting the data item table. In addition, multiple parentage is possible without the need for duplicate copies of data items by separating the storage of the data items from the relationships among the data items.

In another aspect of the invention, the relationship table contains position information associated with the children which is stored as part of a parent/child link. Advantageously, a node's position among other nodes in the same level of the hierarchy may be determined from the information stored in the relationship table.

In yet another aspect of the invention, a matching set defines a relationship between two or more nodes by identifying one or more matching attributes whose values may be compared to determine whether a match exists. Thus, given one node, the matching data items in another node may be identified.

In yet another aspect of the invention, hierarchy aliases provide an alternative to multiple parents that also allow a leaf node to exist in multiple locations in the hierarchy. Whereas a single node has multiple parents, a hierarchy alias is a copy of the node where both the copy and the original each have only a single parent.

In another aspect of the invention, hidden nodes are provided to support the ability to have both a detailed view and a consolidated view of the underlying data.

Figure 4:
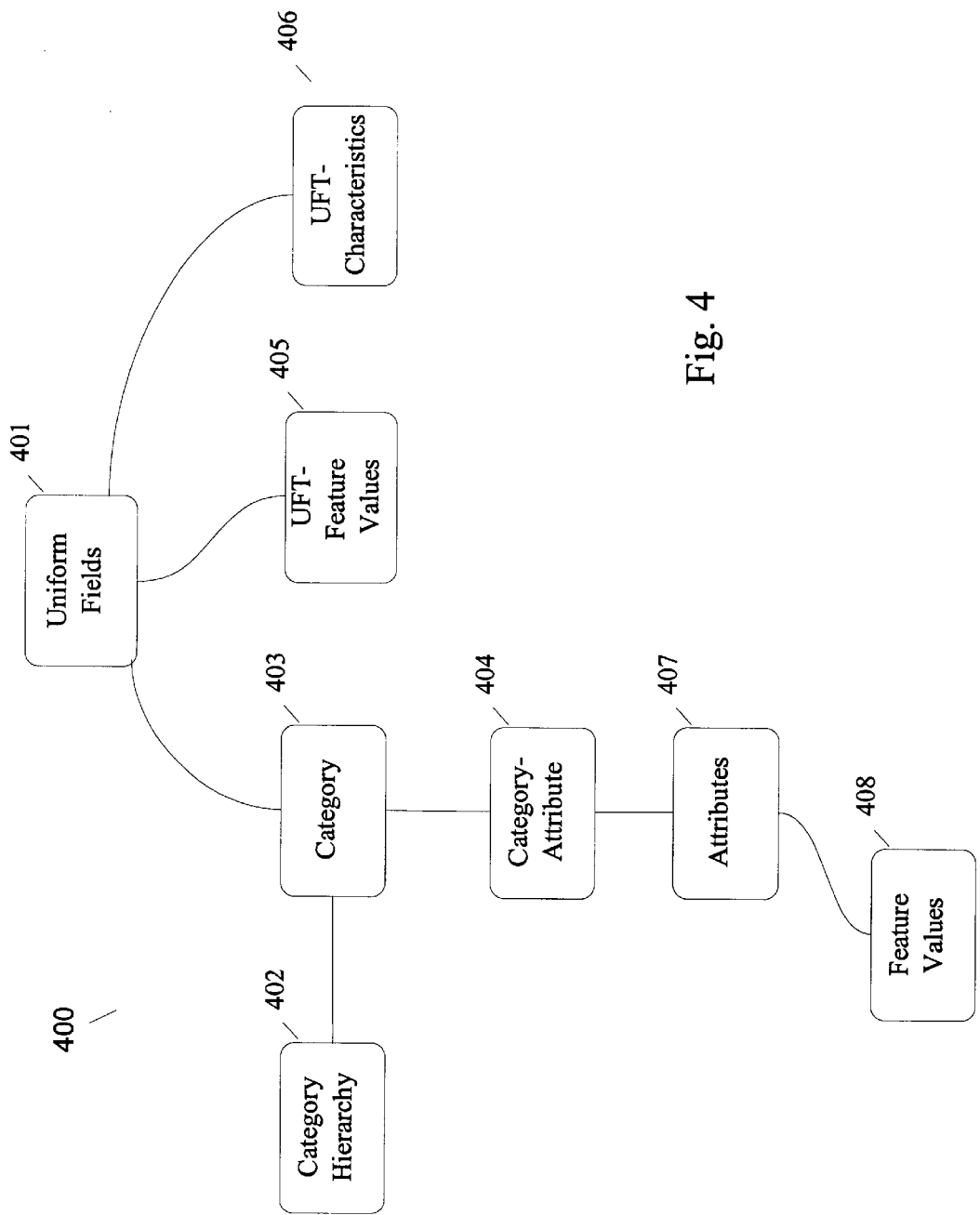
FIG. 4 provides an overview of a table structure according to the present invention.

FIG. 4 provides an overview of a table structure according to the present invention. Table structure 400 includes UFT (Uniform Field(s) Table) 401 which contains data item records with fields that correspond to data elements of the data items that are common to each of the data items having a record in UFT 401. That is, each record in UFT 401 includes data elements that each data item having a record in UFT 401 has in common with the other data items also having a record in UFT 401. One of the fields that each record contains is a reference to category table 403 that identifies each of the categories of attributes. Data elements associated with data items in UFT 401 are analyzed along with the data items to identify those data elements (i.e., fields) that each data item has in common (i.e., fields) and those data elements (i.e., attributes) that are not common to all of the data items. Groups, or categories, of zero or more attributes are associated with a given data item.

Attribute table 407 identifies the attributes that may be includable in a category defined in category table 403. Category-attribute table 404 identifies each of the attributes of attribute table 407 that are contained in a category of category table 403. Category hierarchy table 402 defines hierarchical relationships between categories in category table 402.

A feature attribute has a set of enumerated values which are stored in feature values table 408 and may be assigned as a value of the feature attribute. UFT-Feature table 405 identifies the enumerated value (or value) from the enumerated values in the feature values table 408 that is assigned to an attribute associated with a data item record in UFT 401. That is, UFT-Feature table 405 identifies a cell value for a given data item. Similarly, UFT-Characteristic table 406 identifies a value for a characteristic attribute associated with a record in UFT 401.

A distinction between characteristic and feature attributes provides the ability to optimize storage of feature values. That is, feature values are stored in feature values table 408 along with a unique feature value ID. To assign a value to an attribute, an association is created between the attribute with the feature value using the feature value ID rather than the actual feature value. This can result in a significant storage savings since feature values tend to be repeated and the required storage for a feature value ID is usually much smaller than the required storage for the feature value itself.

Figure 5:
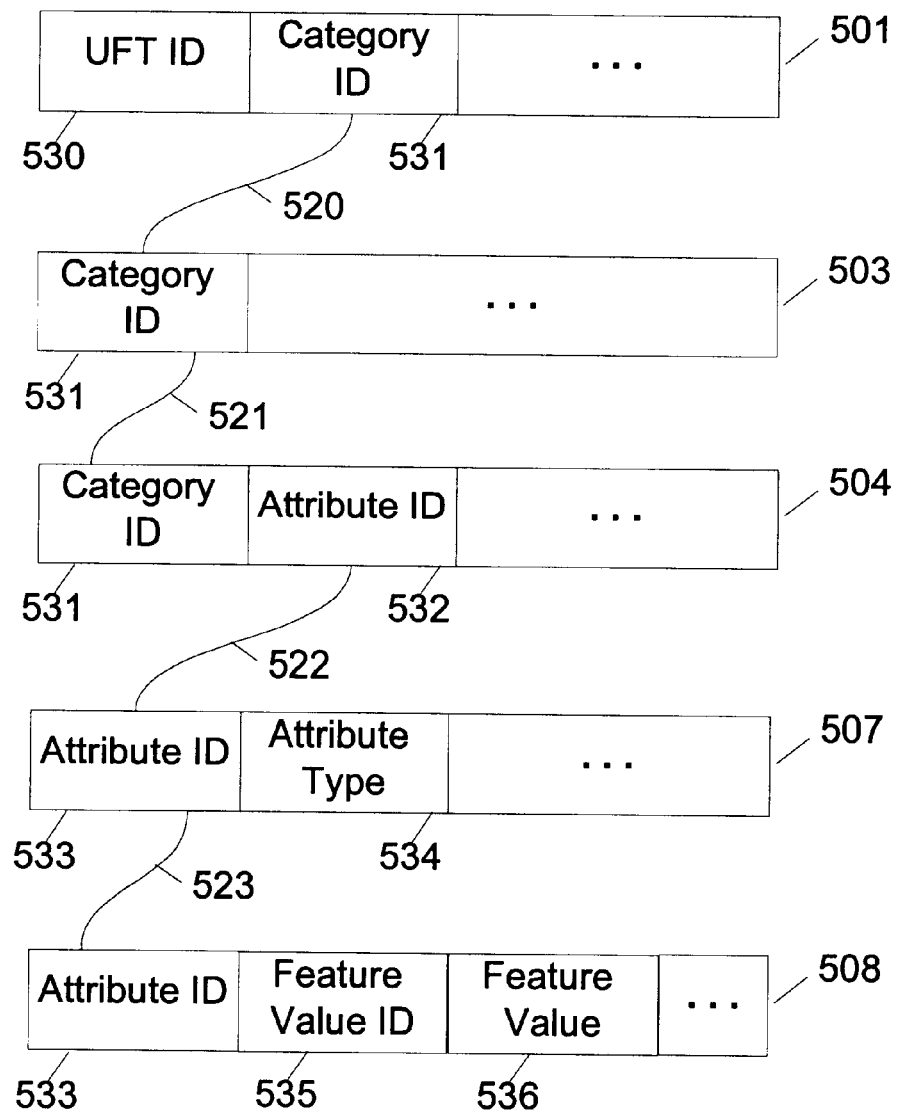
FIG. 5 provides an example of records and the fields from each of these tables.

UFT 401, category table 403, category-attribute table 404, attribute table 407 and feature value table 408 are used to define attributes associated with a data item. FIG. 5 provides an example of records and the fields from each of these tables.

Record 501 of UFT 401 represents a data item and includes a UFT ID (UFT record identification ID) field 530 and a category ID field 531. Preferably, UFT ID 530 provides a unique identifier for record 501 in UFT 401. Category ID field 531 is used to form relationship 520 between record 501 and record 503 in category table 403. Relationship 520 is used to identify the category of attributes associated with record 501 as well as any other records in UFT 401 having a category ID identified in field 531 of record 503.

Relationship 521 is based on category ID field 531 and relates a category to the attributes included in the category. By searching category-attribute table 404 for the category ID in field 531, it is possible to identify all of the attributes in that category. Conversely, it is possible to identify all of the categories defined in category table 503 that include a given attribute.

Record 504 of category table 404 identifies an attribute ID field 532 that is used to form relationship 522 between category-attribute table 404 and attribute table 407. Record 507 of attribute table 407 includes type field 534. Where type field 534 identifies an attribute as a feature attribute, attribute ID field 533 is used to form relationship 523 between record 507 of attribute table 407 and record 508 of feature values table 408. Feature value ID 535 identifies record 508 and feature value field 536 identifies one of the enumerated values for a feature attribute.

Category hierarchy table 402 provides an example of a table that contains parent/child relationships between nodes of a category hierarchy (i.e., a hierarchy whose nodes represent categories). A hierarchy may be defined by associating a record that represents one node of the hierarchy with another record representing another node of the hierarchy. In addition, a position field may be used to define a node position relative to other nodes on the same level of the hierarchy.

Figure 6C:
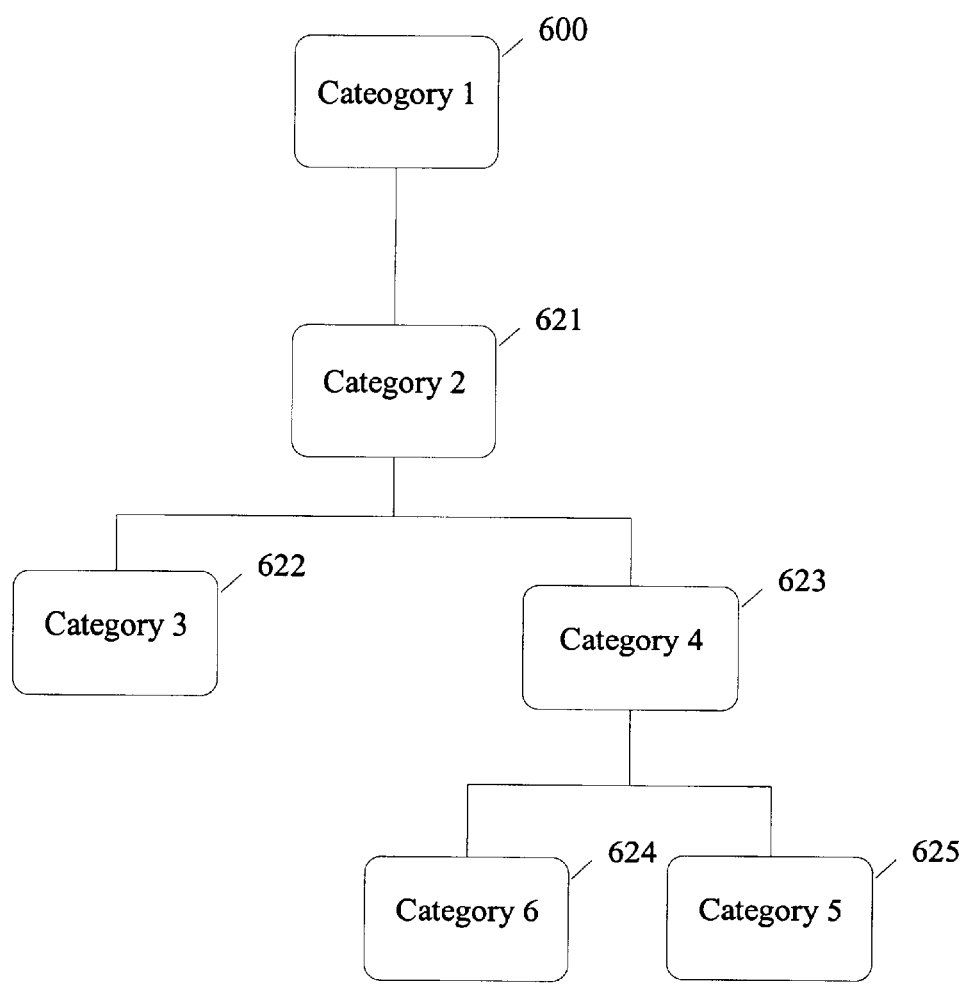

FIGS. 6A through 6C illustrates a category hierarchy defined by category hierarchy table 402 according to the present invention. Record 600 of FIG. 6A represents a record format for use in relating nodes of a category hierarchy. A category ID corresponding to one category record (or node) is related to a parent category record. The same category may be associated with another parent category record with another record in category table 402. Thus, it is possible to identify all parents of a given category and, in combination with category table 403, the set of parent categories of a category may include the parent categories of an alias of the category. Further, it is possible to identify all the categories that are children of a given parent category.

Table 602 of FIG. 6B provides an example of category table 402 according to the present invention populated with data. Records 610 through 615 contain data corresponding to categories 1 through 6 each of which has an associated field identifying a parent category. Category 1 is a root node in the hierarchy defined in table 602 with the remaining categories being descendants of category 1.

FIG. 6C illustrates the hierarchical structure representation defined in category table 602. Nodes 620 through 625 correspond to records 610 through 615 (respectively) of table 602 that represent categories 1 through 6 (respectively). Referring to the hierarchy of FIG. 6C, category 2 is a child of category 1. Categories 3 and 4 are child categories of category 2 and grandchild nodes of category 1. Category 4 has two child categories (i.e., categories 5 and 6).

Since category 6 has three parent categories (i.e., categories 1, 2 and 4), attributes associated with the parent categories may be inherited by category 6. Attributes associated with category 1 are inherited by both of the other parent categories of category 6.

To further illustrate, table 604 provides an example of category attribute table 404 populated with data associated with categories 2 and 3. Since category 2 is associated with attribute 1 and categories 3 through 4 are descendants of category 2, each of categories 3 through 4 are also associated with attribute 1. Thus, category 3 includes attribute 2 by virtue of record 651 lower record of table 604 and also includes attribute 1 by virtue of record 651 upper record and being a descendant of category 2. As discussed in more detail below, category 6 may inherit category 3's attributes if it is not an alias of another category.

FIG. 7 provides an example, according to the present invention, of attribute and feature value tables 407 and 408 populated with data. Attribute 1, a weight attribute, is of type characteristic while attribute 2, a memory attribute, is a feature attribute. Fields 729 and 730 provide additional information associated with characteristic attribute. 1 Field 729 identifies a rating such as nominal, minimum, maximum, average or typical. Thus, for example, where a characteristic attribute is a measurement, a rating can identify a value as a nominal, minimum, etc. measurement. Field 730 specifies a type associated with a characteristic attribute. For example, where the characteristic attribute is a measurement, type may be used to further clarify the measurement type (e.g., length or weight). A characteristic attribute may also have another field associated with it that identifies a unit of measurement.

A feature attribute such as attribute 2 has associated enumerated values which are defined in feature values table 708. Where, for example, attribute 2 of attribute table 707 stores an amount of computer memory, feature values table 708 may be used to define the set of valid installed memory values associated with attribute 2. In the example of feature values table 708, a value of 4, 16 or 64 MB of memory may be assigned as a value of attribute 2 associated with, for example, a data item.

Records contained in the tables depicted in FIG. 4 are used to reconstruct a data item. The data item's structure may be determined from UFT 401, category table 403, category-attribute table 404, attribute table 407 and feature values table 408. These tables are used to identify the fields (or attributes) associated with a data item. Values associated with the data item's fields may be obtained from UFT-feature values table 405 and UFT-characteristics table 406. FIG. 8 provides an example of a data item definition obtained from the tables in FIG. 4.

Record 801 of UFT 401 identifies the data item's category and also those fields that each of the data items in UFT 401 have in common. In the example of FIG. 8, each of the data items have description and price fields in common. Additionally, category ID field can be used to determine whether the data item has additional fields. Referring to records 804A and 804B indicates that the category associated with the data item (i.e., category 2) includes attributes 1 and 2.

The value of attribute 1 is specified in record 806 of UFT-characteristics table 406. That is, for UFT ID 3, attribute 1 (i.e., weight) has a value of 8.22 which is in pounds and has a nominal rating.

The value for attribute 2 associated with the data item may be determined using record 805 of UFT-Feature values table and record 808 of feature values table 408. The attribute and feature value IDs from record 805 are used as a key into feature values table 408 to identify a specific record, record 808, and a feature value of 64 MB.

Thus, as illustrated in fields 840 through 845 of record 800, the data item corresponding to UFT ID 3 is an ACME laptop computer with a price of $2,500.00, weighing 8.22 lbs. and having 64 MB of memory.

A node in a hierarchy inherits attributes from its parent node(s). It is possible to allow a node to inherit attributes from multiple parents by creating multiple hierarchical relationships between a child node and more than one parent node. However, it is possible to limit attribute inheritance using an alias designation. That is, unlike an original node an alias of the original does not inherit attributes from its parent(s). In a case where an alias is used to establish multiple parentage, the original does not inherit attributes from a parent of its alias. Inheritance occurs in the original node only, i.e., the original inherits the attributes of its parent(s).

Figure 9:
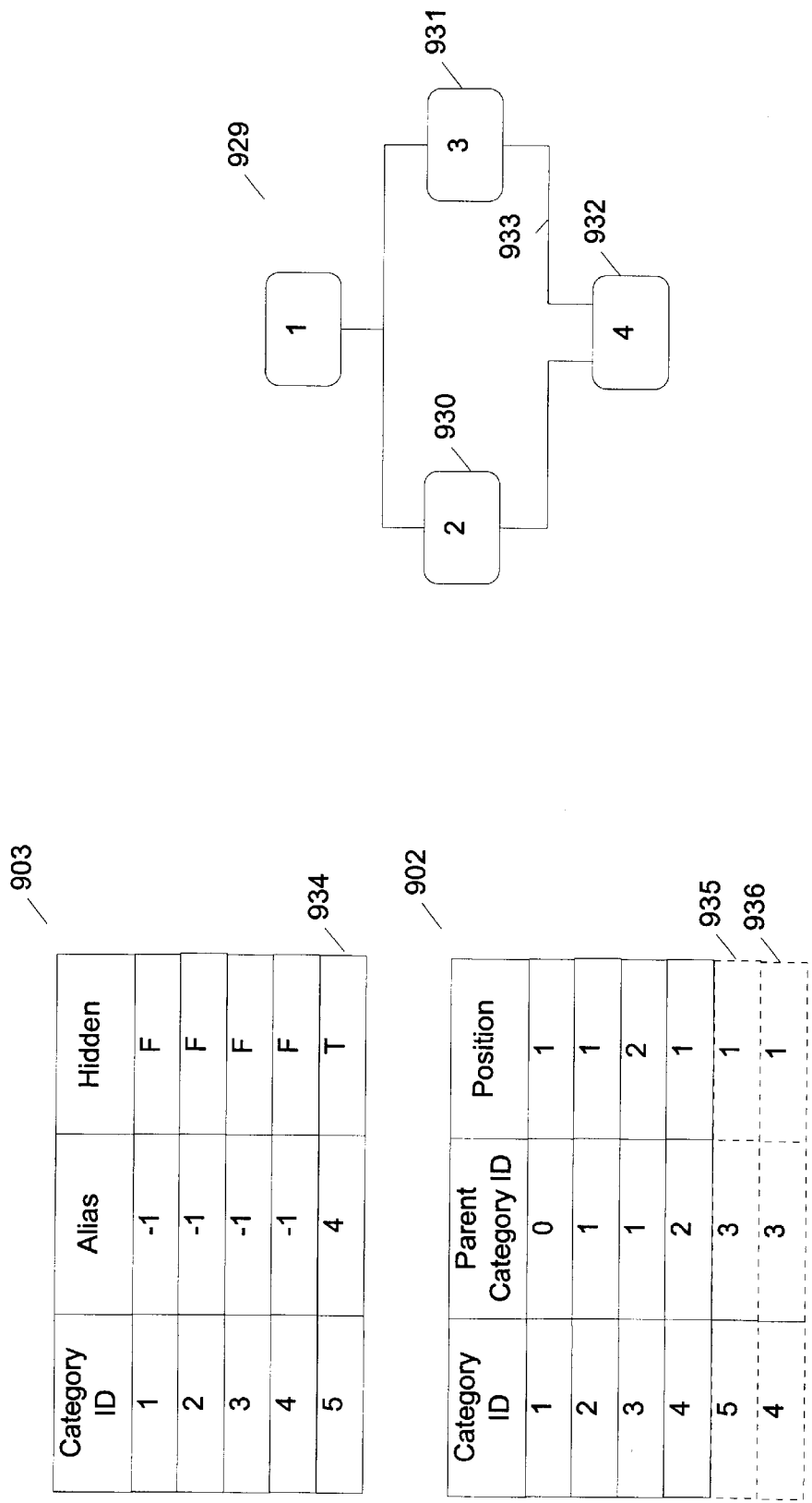
FIG. 9 provides an example of inheritance according to the present invention using original and alias categories.

FIG. 9 provides an example of inheritance according to the present invention using original and alias categories. Category table 903 identifies categories 1 through 5 with category 5 being an alias of category 4. Category hierarchy table 902 defines hierarchical structure 929 such that node 932 is a child node of nodes 930 and 931. The hierarchical relationship between nodes 931 and 932 (relationship 933) may represent a relationship between original categories or between an original and an alias of an original category.

Referring to category hierarchy table 902, relationship 933 may be formed by either record 935 or record 936. As indicated in record 934 of category table 903, record 935 defines a relationship between category 3 and an alias of category 4 (i.e., category 5). In such a case, category 4 inherits attributes from category 2 but not from category 3. However, where as is defined in record 936, relationship 933 is formed using the category 4 instead of its alias, category 4 inherits attributes from both categories 2 and 3.

Figure 10:
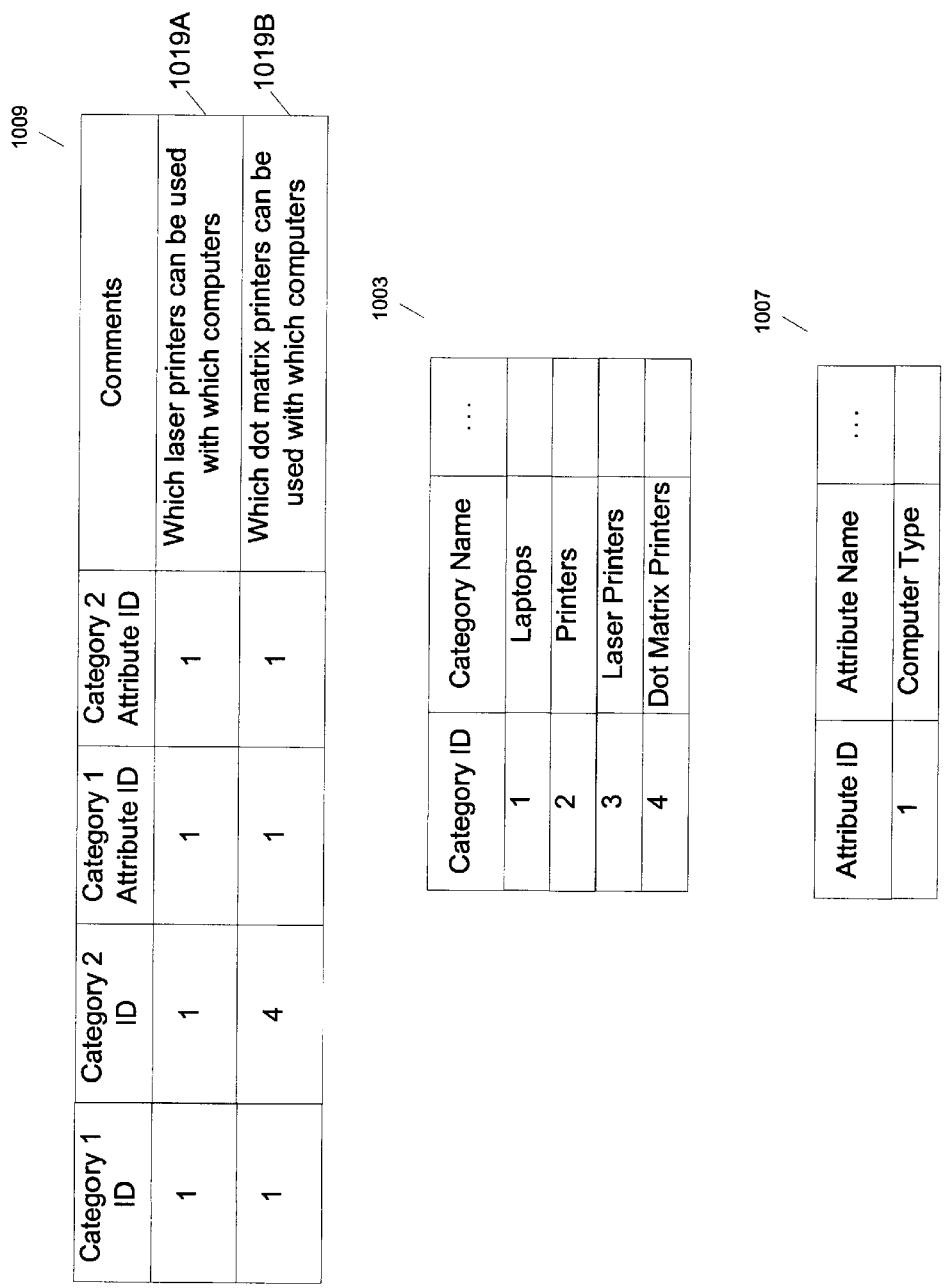
FIG. 10 provides an example of a matching sets table according to the present invention.

FIG. 10 provides an example of a matching sets table according to the present invention. A matching set mechanism allows a user to define a relationship between a pair of leaf nodes by identifying one or more matching attributes whose values must be equal. With matching sets, given a record in one leaf node, the matching records in another leaf node can be automatically identified, and new records that are added to the database automatically fall into the appropriate matching sets so that the sets of matching records remain up-to-date without manual intervention.

Records 1019A and 1019B of matching sets table 1009 identify a matching set associated between category 1 and category 3 and category 1 and category 4 based on attribute 1. The matching set defined in record 1019A associates category 1 with category 3 based on attribute 1 (or computer type as indicated by record 1007). Using the matching set defined in record 1019A, it is possible to determine what laser printers can be used with which computers, for example.

Similarly, record 1019B associates categories 1 and 4 based on attribute 1. That is, like record 1019A, record 1019B defines an association between categories (e.g., a node) based on, in this case, an attribute. Record 1019B may be used to identify the dot matrix printer that can be used with a given computer type.

Figure 11:
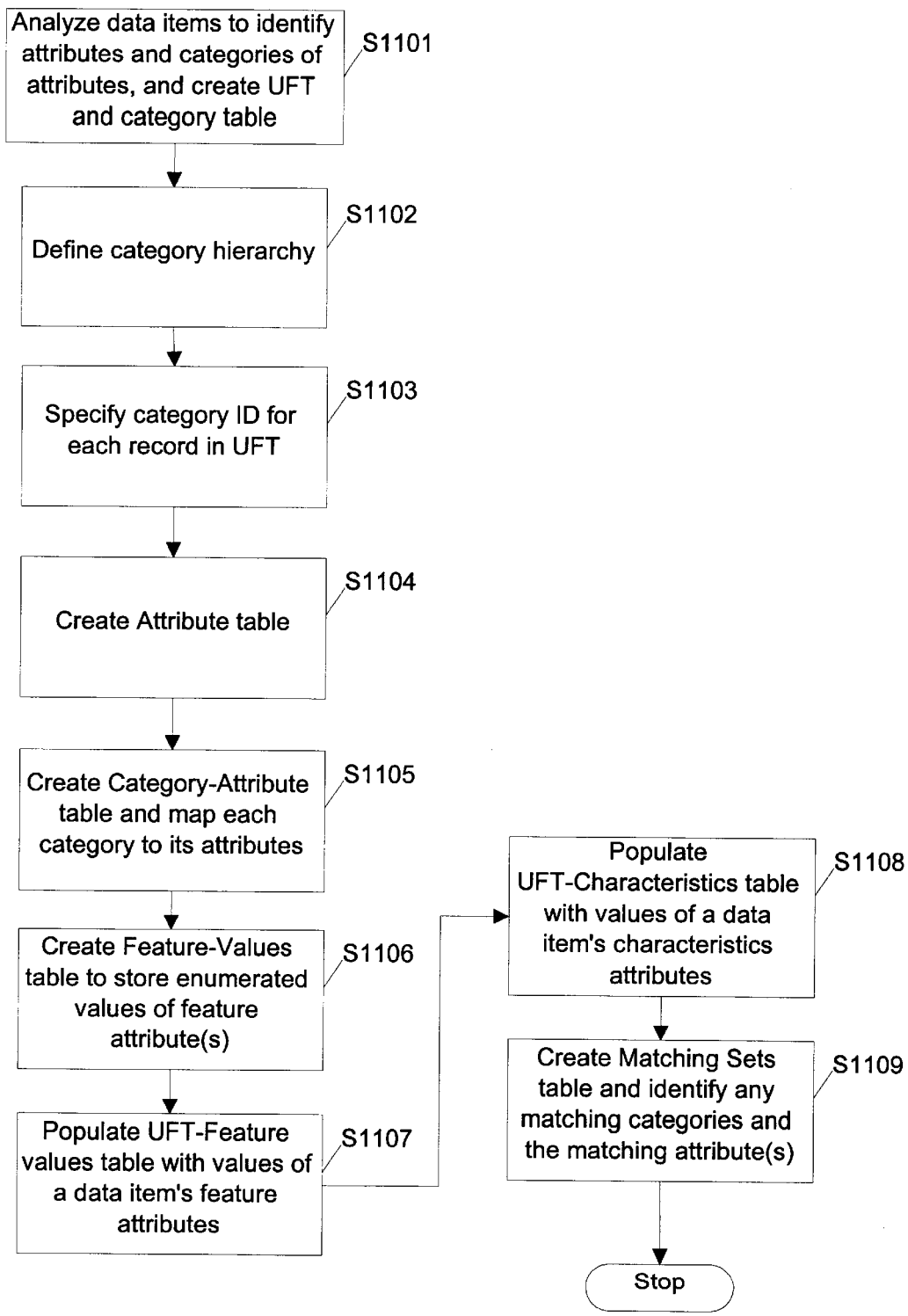
FIG. 11 provides a diagram of process steps to define a schema of FIG. 4 according to the present invention.

The tables of FIG. 4 and their structure are preferably determined by analyzing typical data that is to be stored and their interrelationships. FIG. 11 provides a diagram of process steps to define a schema of FIG. 4 according to the present invention. At step S1101, categories are identified from the data items and their associated attributes. That is, a category is defined for each unique combination of attributes associated with the data items. Data items with like attributes are grouped into the same category. Attributes that are common to all of the data items may be included as fields in UFT 401.

If they do not already exist, at step S1101, UFT 401 and category table 403 are created. UFT 401 includes a record ID (e.g., UFT ID) and attributes common to all of the data items. Category table 403 includes a record for each of the categories, each record comprising fields including a category ID and possibly a category description, or name. Category table 403 may further includes attributes associated with the categories themselves (e.g., an alias and/or hidden attribute).

A hierarchy of categories (e.g., category hierarchy table 402) is defined at step S1102. A criteria that may be used to define the hierarchy may be based on the attributes associated with each to make use of attribute inheritance. Alternatively, a hierarchical relationship defined in category hierarchy table 402 may reflect a real world relationship between the data items such as where one data item is a subtype of another data item (e.g., a laser printer is a subtype of a printer). In such a case, it is likely that a type and its subtype may share one or more attributes. Category hierarchy table 402 associates a category ID with a parent category ID and a position within a level of the hierarchy.

At step S1103, a category ID is inserted in each of the records of UFT 401 to associate a data item with at least one category. At step S1104, attribute table 407 is created to store the attributes of the categories identified in step S1101. Each record in attribute table 407 preferably includes an attribute ID, type (e.g., feature or characteristic) and for characteristic attributes, ratings and measurement type fields. Alternatively, the fields used only by characteristic attributes may be stored in a separate table.

At step S1105, a mapping is defined between a category and its attributes, such as the mapping stored in category-attribute table 404 which maps an attribute and the category (or categories) to which the attribute belongs. Attribute inheritance may be used to simplify the process by assigning an attribute to a parent category whose attributes may be inherited by each of the parent category's child, non-alias, categories.

At step S1106, feature values table 408 is created to store values that can be assigned to a given feature. Each entry in the table preferably includes feature ID, feature value ID, and value fields.

At step S1107, UFT-feature values table 405 is populated with records to identify the values of feature attributes for the data item records in UFT 401. That is, for example, each record in UFT-feature values table 405 assigns a value to an attribute associated with a data item stored in a record of UFT 401. At step S1108, UFT-characteristics table 406 is populated with records to identify the values for characteristic attributes associated with a record in UFT 401.

At step S1109, matching sets table 1009 is generated to identify matching categories and the attribute (or attributes) that are used to establish a match or lack thereof.

Figure 12:
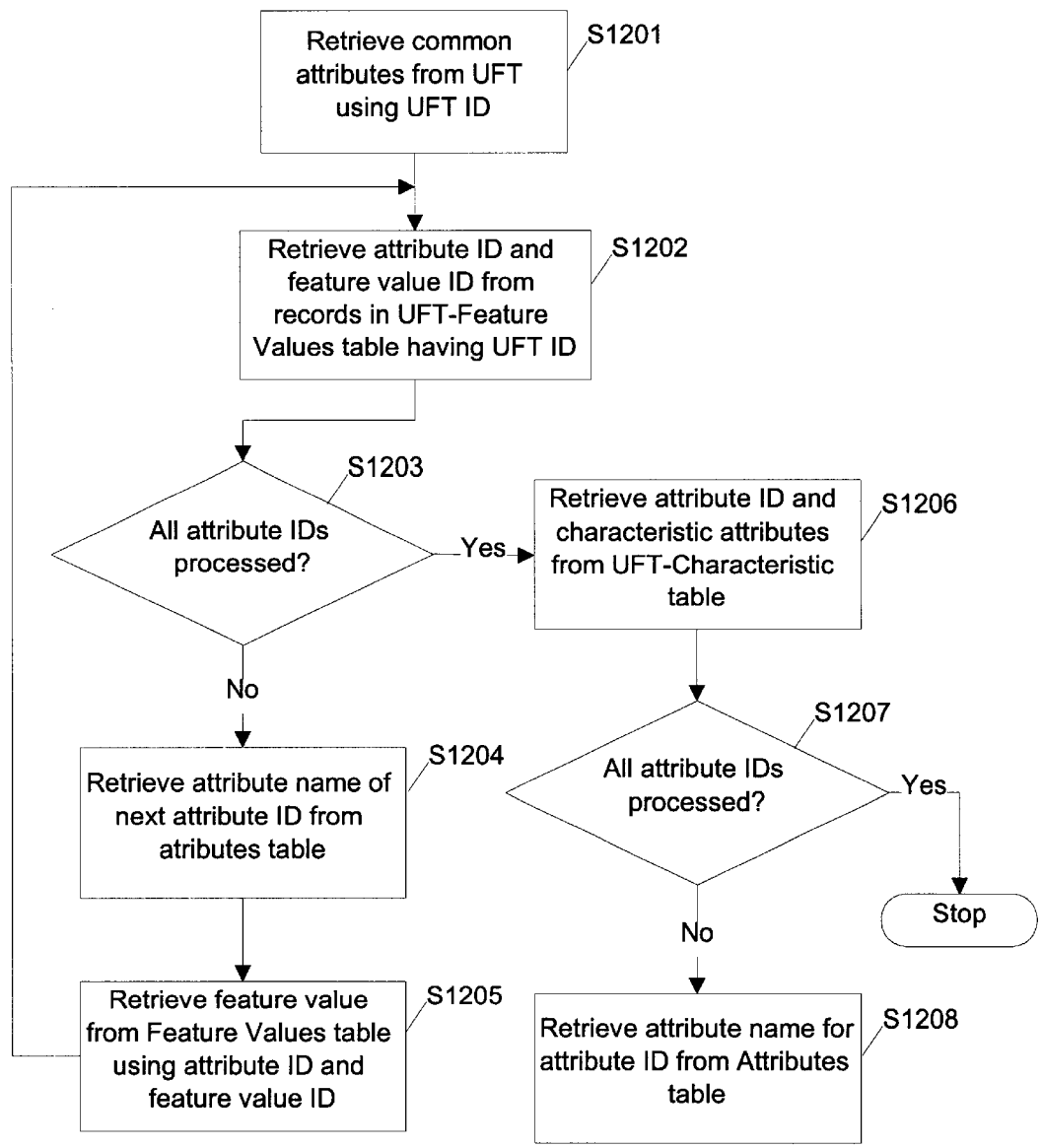
FIG. 12 provides a diagram of process steps to retrieve a value for attributes of a data item having a record in a UFT (Uniform Field(s) Table).

FIG. 12 provides a diagram of process steps to retrieve a value of attributes of a data item having a record in a UFT (Uniform Attribute Table). In brief, UFT 401, UFT-feature values table 405 and UFT-characteristics table 406 are queried to retrieve each attribute (including values for inherited attributes) associated with the data item's UFT ID specified in the corresponding record in UFT 401. Common attributes are retrieved from UFT 401, feature attributes are retrieved from UFT-feature values table 405 and characteristic attributes from UFT-characteristics table 406.

At step S1201, the data item's common attributes are retrieved from UFT 401 using the UFT ID associated with the data item. At step S1202, records in UFT-feature values table 405 that correspond to UFT ID are retrieved. The records include an attribute ID as well as a feature value ID. Each of the records retrieved in step S1202 from UFT-feature values table 405 are processed to retrieve an associated value. If it is determined, at step S1203, that all of the retrieved records have been processed, processing continues at step S1206 to retrieve the characteristic attribute data associated with the data item. If it is determined that not all of the records retrieved in step S1202 have been processed, processing continues with steps S1204 and S1205 to retrieve the feature attribute data values.

More particularly, for each record retrieved in step S1202, the feature value ID associated with the attribute ID is retrieved from the attributes table 407 at step S1204. At step S1205, the feature value associated with an attribute ID and feature value ID combination retrieved in step S1202 is used to retrieve the feature value from feature values table 408. Processing continues at step S1203 to process any remaining records.

If all of the feature attribute values have been processed, steps S1206 through S1208 retrieve the characteristic attribute data associated with the data item. At step S1206, the data item's UFT ID is used to retrieve attribute ID and characteristic data from UFT-characteristics table 406. At step S1207, a determination is made whether all of the records retrieved in step S1206 have been processed. If so, processing ends. If not, processing continues at step S1208 to retrieve an attribute name from attributes table 407 using the attribute ID.

Figure 13:
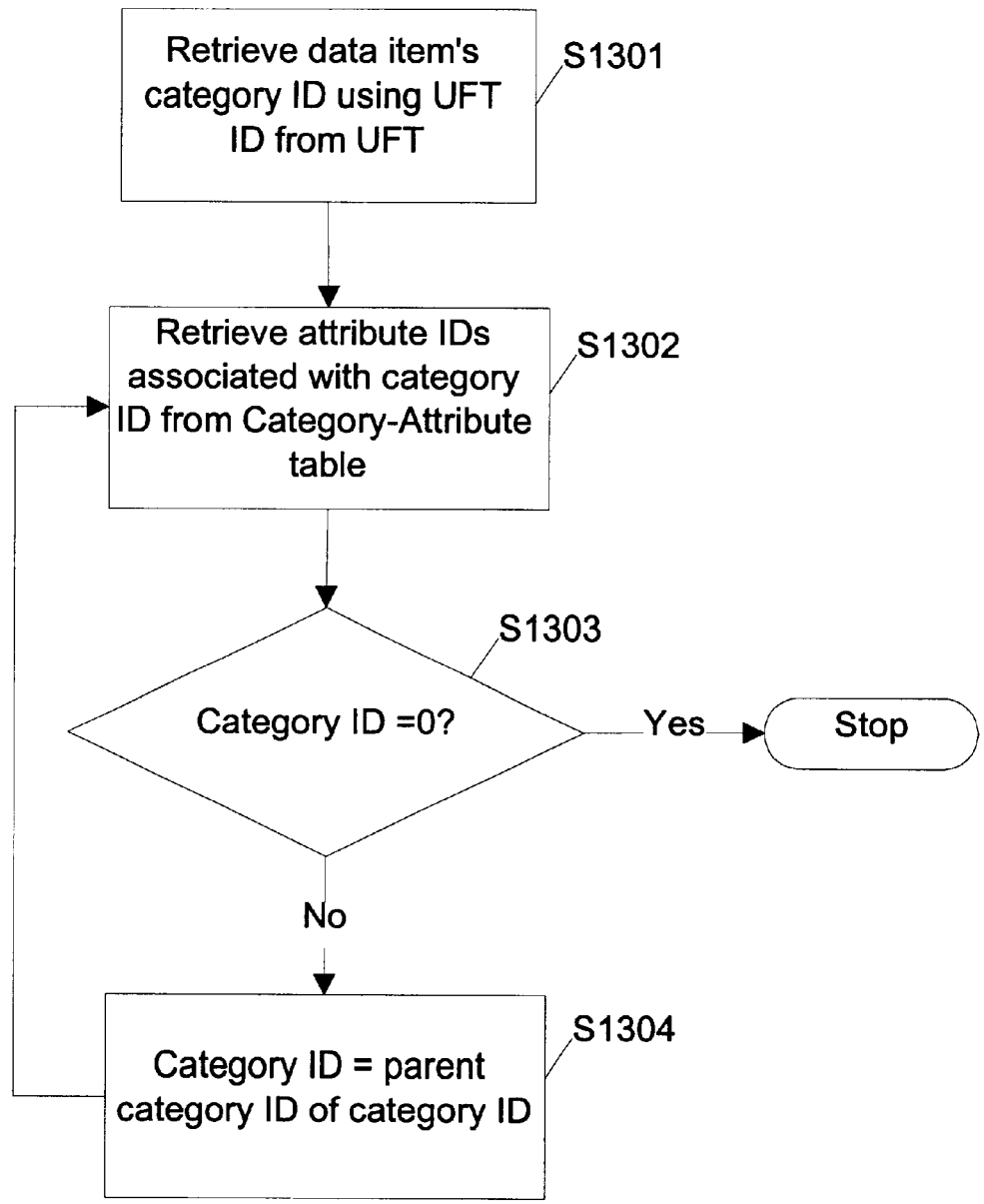
FIG. 13 identifies a diagram of process steps to determine a data item's attributes according to the present invention.

UFT-features table 405 and UFT-characteristics table 406 include records for each of a data item's attributes for which a value has been assigned whether or not the attribute is an inherited attribute. It may be necessary at times such as data entry to identify each of a data item's attributes, including inherited attributes, whether or not a value is assigned for the attribute. FIG. 13 identifies a diagram of process steps to determine a data item's attributes according to the present invention. The process flow identifies the attribute IDs for each of the attributes associated with a data item, or record in UFT 401.

At step S1301, a data item's category ID is retrieved from UFT 401 using the data item's UFT ID. At step S1302, each record having the category ID value retrieved in step S1301 are retrieved from category-attribute table 404. Each of the records retrieved in step S1302 having an attribute ID for an attribute in the category identified by the category ID.

If it is determined, at step S1303, that there are no parents of the present category (e.g., the data item's category), processing ends at step S1305. Otherwise, at step S1304, the category ID is reassigned to the parent category of category ID. That is, after execution of step S1304, the category ID points to the parent category of the present category. In effect, step S1304 causes the attribute retrieval process to traverse from the data item's category up the category hierarchy. Processing continues at step S1302 to retrieve the attribute IDs associated with the category ID.

While the present invention may be used with various types of data, one such type is catalog data (i.e., data used in the preparation of a catalog such as a parts, or products, catalog). Catalog data is typically structured data. However, there exists a great deal of pre-existing, or legacy, catalog databases having various formats. Thus, data with a variety of distinct formats and schemas with incompatible product categorizations and structural deficiencies must be merged. Normalizing, cleansing and restructuring of legacy product data after it has been imported into a DBMS is difficult if not impossible using existing systems.

The structures described herein facilitate in-place schema and data manipulation. Conventional data management systems lack the tools necessary to perform extensive restructuring of data, such as bulk updates to large groups of records or changing data types and interrelationships between database records, while still allowing the data to be accessed (e.g., for retrieval and modification). To perform extensive restructuring, the conventional approach is either to define a correct structure prior to importing the date, or export the data to another location (e.g., a file and/or another application), edit and restructure the database and then reimport the data into the modified database structure.

The present invention permits unlimited editing and restructuring of a database even after it has been stored in a DBMS. The present invention provides a variety of tools to modify the database schema and to manipulate existing data in a fully populated database. Using these tools, raw data can be normalized, cleansed and restructured within a database itself after the initial import. An otherwise complex and amorphous process is thus broken down into sequence of simple, discrete steps. In-place schema and data manipulation according to the present invention include operations to insert, move, consolidate, partition and merge a category, link, unlink, promote, demote, merge and split an attribute, reassign a rating, and convert an attribute from numeric to text (or vice versa).

The following provides exemplary operations, according to the present invention, that may be used for in-place schema and data manipulation usable with a populated database:

| Operation | Description |
|---|---|
| Insert Category | Inserts a new category into a category hierarchy. |
| Move Category | Moves a category between locations in a category hierarchy. |
| Consolidate Category | Combines all of the children of a single parent category, creating a new category containing the values of the old children. |
| Partition Category | Splits a category into children based on the values of an attribute. |
| Merge Category | Merges one category into another. |
| Link Attribute | Adds an attribute to an existing category. |
| Unlink Attribute | Removes an attribute from an existing category. |
| Promote Attribute | Relinks an attribute to the parent for inheritance by the children. |
| Demote Attribute | Relinks an attribute from the parent to each of the children. |
| Merge Attributes | Combines two attributes into one, including all references to each attribute. Color coding identifies whether settings or text values come from the first, the second, or both of the original attributes. |
| Split Attribute | Splits a single attribute into many, including all references. |
| Reassign Rating | Reassigns the underlying numeric data values to a different rating. |
| Convert Numeric Attribute | Changes a numeric attribute to a text attribute, automatically converting all of the underlying numeric data values. Includes a string representing the unit of measure and respects the number of decimal places and show fractions settings. |
| Convert Text Attribute | Changes a text attribute to a numeric attribute, converting all of the underlying text data values to numeric values, along with a unit of measure, if specified, after prompting the user for the numeric values that correspond to each text value. |

There are several approaches to accessing the DBMS data. For clarity and ease of understanding, this discussion describes using SQL to access disk-based data that is stored and managed by the DBMS. Alternatively, the entire database may be read from the DBMS and stored in memory. Such a memory-based approach has the advantage of bypassing SQL for access to specify data items and delivering superior performance. A disadvantage of this approach is the requirement for substantially more memory than the first approach as well as custom development of functionality that SQL already implements.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A method for efficient storage and retrieval of catalog information comprising:

identifying a set of attributes associated with data items;

creating a common data structure for said data items that excludes a first attribute from said set of attributes unique to any selected first data item selected from said data items;

associating a first data item with said first attribute excluded from said common data structure;

creating a category data structure for storing information corresponding to a category said category data structure comprising a set of alias fields, wherein a first category having a first alias field from said set of alias fields is configured to reference a second category having a second category ID and wherein a second set of attributes from said set of attributes which corresponds to said second category and said second category's set of parent categories are not inherited by said first category;

associating said first data item with a third category;

creating an attribute data structure comprising category attributes from said set of attributes where said category attributes are common to a plurality of said data items;

associating at least one category with at least one attribute from said category attributes via a category-attribute data structure;

creating a category hierarchy data structure; and, associating a hierarchy of categories within said category hierarchy data structure, wherein said category hierarchy data structure comprises at least one parent category and at least one child category wherein said at least one child category inherits at least one parent attribute from said category attributes and wherein a given child category set is associated with at least one set of parent categories and wherein said at least one child category comprises a position value associated with a given parent category.

2. The method of claim 1 further comprising:

creating a matching set data structure associating a plurality of categories based on at least one matching attribute value associated with each of said plurality of categories wherein a match is produced when said at least one matching attribute value is equal for each of said plurality of categories.

3. The method of claim 2 further comprising:

checking for a match between said data items.

4. The method of claim 1 further comprising:

restructuring a database while allowing said database to be accessed.

5. The method of claim 4 wherein restructuring further comprises:

inserting a new category into said hierarchy of categories.

6. The method of claim 4 wherein restructuring further comprises:

moving a category between locations in said hierarchy of categories.

7. The method of claim 4 wherein restructuring further comprises:

consolidating said at least one child category associated with a single parent category into a consolidated category.

8. The method of claim 4 wherein restructuring further comprises:

partitioning a category into new children categories based on values of a partition attribute associated with said category.

9. The method of claim 4 wherein restructuring further comprises:

merging a category into an existing category.

10. The method of claim 4 wherein restructuring further comprises:

adding an attribute into an existing category.

11. The method of claim 4 wherein restructuring further comprises:

removing an attribute from an existing category.

12. The method of claim 4 wherein restructuring further comprises:

promoting an attribute from a promoting child category to a promoted parent category for inheritance by children of said promoted parent category.

13. The method of claim 4 wherein restructuring further comprises:

demoting an attribute from a demoting parent category to children of said demoting parent category.

14. The method of claim 4 wherein restructuring further comprises:

merging a merge attribute into a second attribute.

15. The method of claim 4 wherein restructuring further comprises:

splitting a split attribute into at least one second attribute.

16. The method of claim 4 wherein restructuring further comprises:

converting an attribute from a first format to a second format.

17. The method of claim 1 wherein said attribute data structure comprises an attribute type.

18. The method of claim 17 wherein said attribute type is a feature attribute comprising an associated set of enumerated values.

19. The method of claim 18 wherein an enumerated feature values data structure is used to store an enumerated value of said feature attribute.

20. The method of claim 17 wherein said attribute type is a characteristic attribute comprising an unenumerated value.

21. The method of claim 20 wherein said characteristic attribute comprises a property of rating, measurement type and units of measurement.

22. The method of claim 4 wherein restructuring further comprises:

reassigning a rating of a second attribute.

* * * * *